W. S. Winsor,
Saw Teeth.
N° 33,673.   Patented Nov. 5, 1861.
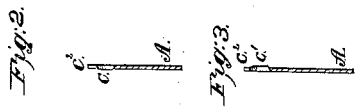
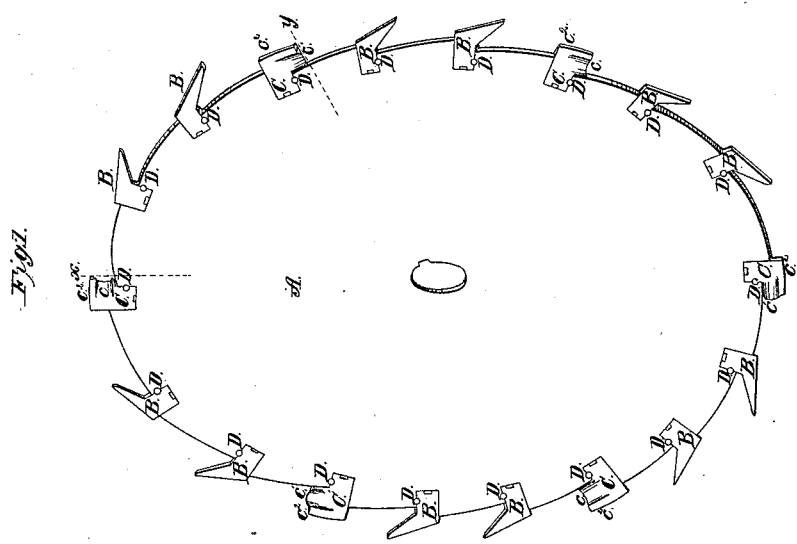
Witnesses:
Inventor:

UNITED STATES PATENT OFFICE.

WILLIAM S. WINSOR, OF PORT ORFORD, OREGON.

PLANING-SAW.

Specification of Letters Patent No. 33,673, dated November 5, 1861.

*To all whom it may concern:*

Be it known that I, WILLIAM S. WINSOR, of Port Orford, in the county of Curry and State of Oregon, have invented a new and useful Improvement in Planing-Saws; and I do hereby declare that the following is a full, clear, and exact description of the same, reference being had to the accompanying drawings, making part of this specification, in which—

Figure 1 is a perspective view of the improved saw. Figs. 2 and 3 are fragmentary sections at $x$ and $y$ respectively.

Similar letters of reference indicate corresponding parts in the several figures.

The nature of the said invention consists in the use of peculiarly constructed planing teeth having projecting flanges which run in the kerf of the saw to support and steady the cutters as hereinafter explained.

To enable others skilled in the art to make and use my invention I will proceed to describe its construction and operation.

A represents a saw plate formed on its periphery with suitable notches or cavities to receive the shanks of movable teeth B C C'.

D D are keys by which the teeth are secured. The ripping teeth B may be formed with points slightly exceeding in thickness the saw plate A but are not "set" to project on different sides. The planing teeth are constructed with convex cutters $c$ $c'$ projecting laterally on opposite sides and flanges $c^2$ projecting radially beyond the said cutters and adapted to follow in the path of the planing teeth.

The manner of arranging the teeth in the saw is clearly shown in Fig. 1. Two ripping teeth B B follow in succession then a planing tooth C with the cutter $c$ projecting to the right, next two more ripping teeth and then a planing tooth C', with the cutter $c'$ projecting to the left next two more ripping teeth and then a planing tooth C and so on around the saw. The flanges $c^2$ projecting beyond the cutters into the kerf of the saw support the cutters, steady them to their work and prevent their lateral deflection. The successive cutters plane each side of the kerf and the concavity on one side of each permits the free escape of shavings. The arrangement greatly reduces friction upon the saw plate and thus prevents heating and consequent buckling. A free passage is opened for the saw and smooth lumber produced with a less expenditure of power and less waste of timber than in the customary process.

Having thus described my invention what I claim as new and desire to secure by Letters Patent is:

The supporting flanges $c^2$ employed in connection with the cutters $c$ and $c'$ of a circular saw substantially as and for the purposes set forth.

The above specification of my improved planing saw signed this 16th day of September 1861.

WM. S. WINSOR.

Witnesses:
OCTAVIUS KNIGHT,
L. W. BENDRÉ.